United States Patent [19]

Mazza

[11] Patent Number: 4,619,429
[45] Date of Patent: Oct. 28, 1986

[54] COPY HOLDER FOR DATA PROCESSING WORK STATION

[76] Inventor: Louis S. Mazza, 5737 Drexel Dr., Garland, Tex. 75043

[21] Appl. No.: 657,983

[22] Filed: Oct. 5, 1984

[51] Int. Cl.⁴ .............................................. A47B 97/04
[52] U.S. Cl. ................................ 248/447.2; 248/442.2; 248/448; 248/451
[58] Field of Search ............... 248/447.2, 448, 149, 248/447.1, 442.2, 286, 317, 323, 201, 231.7, 451, 452, 453, 359.1, 359.5; 108/102, 33, 42, 5, 143, 137

[56] References Cited

U.S. PATENT DOCUMENTS

| | | | |
|---|---|---|---|
| 1,928,327 | 9/1933 | Butler | 108/33 X |
| 2,260,695 | 10/1941 | Self | 108/102 X |
| 3,092,364 | 6/1963 | Sarafinas | 248/359.1 |
| 3,495,519 | 2/1967 | Alfsen et al. | 108/102 X |
| 4,319,367 | 3/1982 | Cantillo | 108/102 X |
| 4,365,561 | 12/1982 | Tellier et al. | 108/7 |
| 4,475,705 | 10/1984 | Henneber et al. | 248/447.2 |

FOREIGN PATENT DOCUMENTS

| | | | |
|---|---|---|---|
| 0739507 | 1/1933 | France | 108/143 |
| 0962896 | 7/1964 | United Kingdom | 108/143 |

*Primary Examiner*—Ramon O. Ramirez
*Attorney, Agent, or Firm*—Glaser, Griggs & Schwartz

[57] ABSTRACT

A copy holder assembly mountable onto the CRT cabinet of a data processing work station is disclosed. The copy holder includes correspondence boards and a memo board which are coupled to a harness assembly. The harness assembly includes an elastic strap, first and second hinge assemblies and a cross bar. The elastic strap is lashed around the cabinet bottom and tensions the hinge assemblies into compressive engagement with the CRT cabinet. In an alternate embodiment, the hinge assemblies and cross bar are coupled to the CRT cabinet by hook and loop fasteners. The correspondence boards are adjustable in elevation and pitch for optimum presentation of printed sheet material.

12 Claims, 7 Drawing Figures

COPY HOLDER FOR DATA PROCESSING WORK STATION

BACKGROUND OF THE INVENTION

1. Field of the Invention

The present invention relates generally to computer work station accessories, and in particular to copy holding apparatus for use in combination with CRT data display units.

2. Description of the Prior Art

In the operation of a data processing work station, an operator visually scans a data display unit and refers to instruction manuals and data input materials while inputting data and instructions on a keyboard. In a typical work station, the data display unit is a cathode ray tube (CRT) which is enclosed within a housing, with a keyboard situated immediately in front of the CRT display. The CRT display screen is enclosed within a small cabinet which stands upon a desk or work table. Other equipment such as a telephone, modem, calculator and the like also may be situated around the CRT cabinet. Consequently, only a limited amount of table space is available for the presentation of input data materials and operator manuals.

Some "stand alone" copy holders are available but are not large enough to hold the heavy instruction manuals and computer print-out sheet materials which are commonly used in data processing work stations. Those conventional copy holders which are available cannot hold the input material or copy material at the appropriate elevation for convenient scanning by the keyboard operator. Because the materials are held at a different elevation and distance from the operator, the material to be scanned appears at a different focal length, which may cause eye strain and lead to operator fatigue, as well as being outside of convenient reach of the operator.

OBJECTS OF THE INVENTION

It is, therefore, the principal object of the present invention to provide an improved copy holder which is mountable onto the data display cabinet of a data processing work station which is capable of supporting printed sheet material in a position laterally adjacent to the data display screen, in which the sheet material is held at an elevation and distance substantially the same as the elevation and operator focal length of data presented on the data display screen, respectively.

A related object of the invention is to provide an improved copy holder which is mountable onto data display units of various cabinet dimensions and configurations.

Another object of the invention is to provide an improved copy holder which is mountable onto a data display cabinet and which is capable of supporting heavy and oversized operator manuals.

Yet another object of the invention is to provide an improved cabinet mountable copy holder which can be quickly installed onto a data display cabinet and which can be easily removed.

Still another object of the invention is to provide an improved cabinet mountable copy holder for printed sheet material in which the copy holding means is adjustable in elevation, pitch and laterally with respect to the data display screen.

Another object of the invention is to provide an improved cabinet mountable copy holder which is stabilized against shifting movement which might otherwise occur due to unbalanced loading.

SUMMARY OF THE INVENTION

The foregoing objects are provided by a copy holder assembly which is mountable onto the CRT cabinet of a data processing work station. The copy holder includes correspondence boards and a memo board which are coupled to a harness assembly. The harness assembly includes an elastic strap, first and second hinge assemblies and a cross bar. The elastic strap is lashed around the cabinet bottom and tensions the hinge assemblies into compressive engagement with the CRT cabinet. The correspondence boards are adjustable in elevation and pitch for optimum presentation of printed sheet material. The correspondence boards are supported on laterally opposite sides of the CRT cabinet, with their lateral positions being adjustable relative to the data display screen. According to this arrangement, the sheet material is held at an elevation and distance comparable to the operator focal length of data presented on the data display screen.

The hinge assemblies are slidably mounted onto the cross bar, and the length of the elastic strap is adjustable so that the harness assembly can be fitted and mounted about data display units having various cabinet dimensions and configurations.

One or more cross bars are utilized to provide mechanical strength so that the correspondence boards can support heavy and oversized operator manuals. The harness assembly is conformable to the CRT cabinet configuration by adjusting the separation of the hinge assemblies along the cross bar, and by the pivot action of the hinge assemblies. In the preferred embodiment of the invention, comfortable pads are interposed between the hinge assemblies and the cabinet to provide a positive frictional engagement between the hinge assemblies and the CRT cabinet which stabilizes the holder assembly against shifting movement which might otherwise occur due to unbalanced loading of the left and right correspondence boards.

According to an alternate embodiment, the elastic strap is eliminated, with the hinge assemblies and cross bar being secured onto the cabinet by a hook and loop fastener assembly. In this arrangement, the side hinge plate of each hinge assembly is provided with either a hook or a loop fastener pad, and the cabinet sidewall surface adjoining the hinge side plate is provided with a complementary hook or loop fastener pad. The hook and loop fastener pads are adhesively bonded onto the hinge plate and CRT cabinet sidewall. A deformable pad is interposed between the top hinge plate of each hinge assembly and the top panel of the CRT cabinet.

The novel features which characterize the invention are defined by the appended claims. The foregoing and other objects, advantages and features of the invention will hereinafter appear, and for purposes of illustration of the invention, but not of limitation, an examplatory embodiment is shown in the appended drawings.

DETAILED DESCRIPTION OF THE PREFERRED EMBODIMENT

Figure 1:
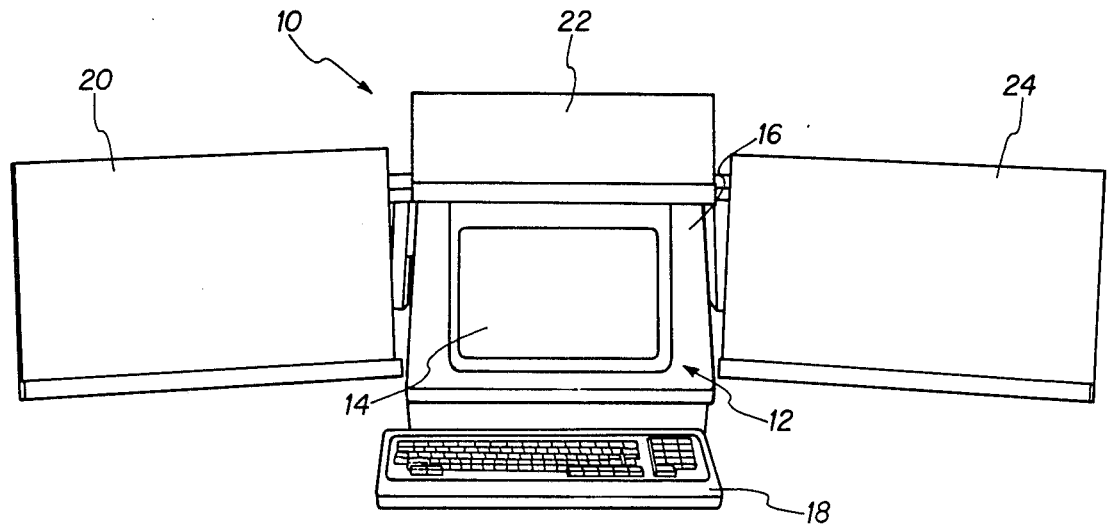
FIG. 1 is a front elevation view of the copy holder asssembly of the invention mounted onto the CRT cabinet of a data processing work station, in which the correspondence boards are adjusted for holding copy material in an optimum scanning position relative to the CRT screen.

In the description which follows, like parts are marked throughout the specification and drawings with the same reference numerals, respectively. The drawings are not necessarily to scale and in some instances portions have been exaggerated in order to more clearly depict certain features of the invention.

Figure 2:
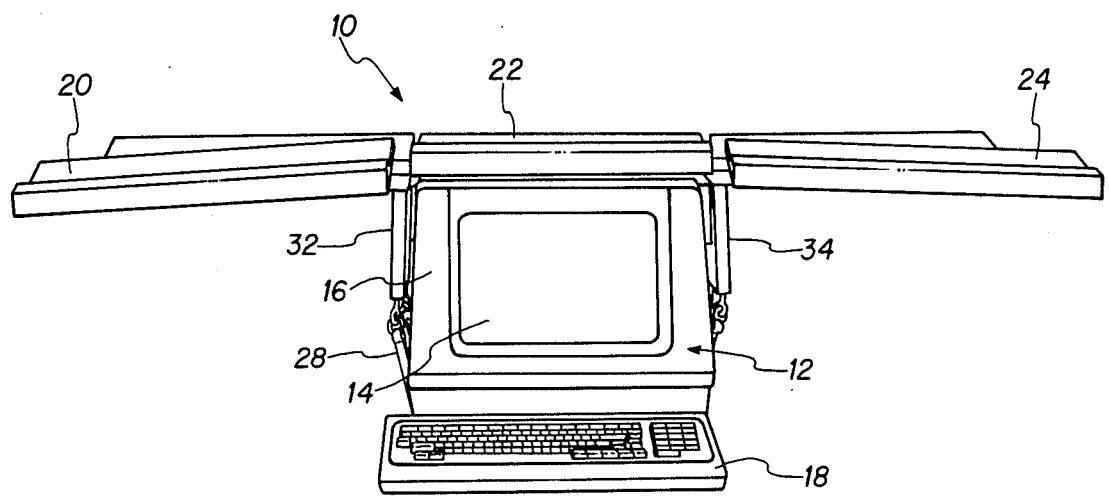
FIG. 2 is a view similar to FIG. 1 in which the correspondence boards are rotated to a fully retracted position in which the harness assembly of the invention is revealed.

Referring now to FIGS. 1 and 2, a copy holder assembly 10 constructed according to the teachings of the invention is mounted upon a data display unit 12. The data display unit 12 includes a cathode ray tube (CRT) data display screen 14 mounted within a cabinet 16 which is adapted to stand upon a desk or work table. The data display unit 12 may be a self-contained computer unit, or may be a remote data display terminal which is coupled to a central computer.

The copy holder assembly 10 includes a left side correspondence board 20, a central memo board 22 and a right side correspondence board 24. The display position of the correspondence boards is adjustable in elevation and pitch relative to the data display screen 14 to suit individual operator preference. The pitch of the correspondence boards and of the memo board is adjustable through a range of approximately 90 degrees from the vertical orientation as illustrated in FIG. 1, to the approximately horizontal orientation as illustrated in FIG. 2.

Figure 3:
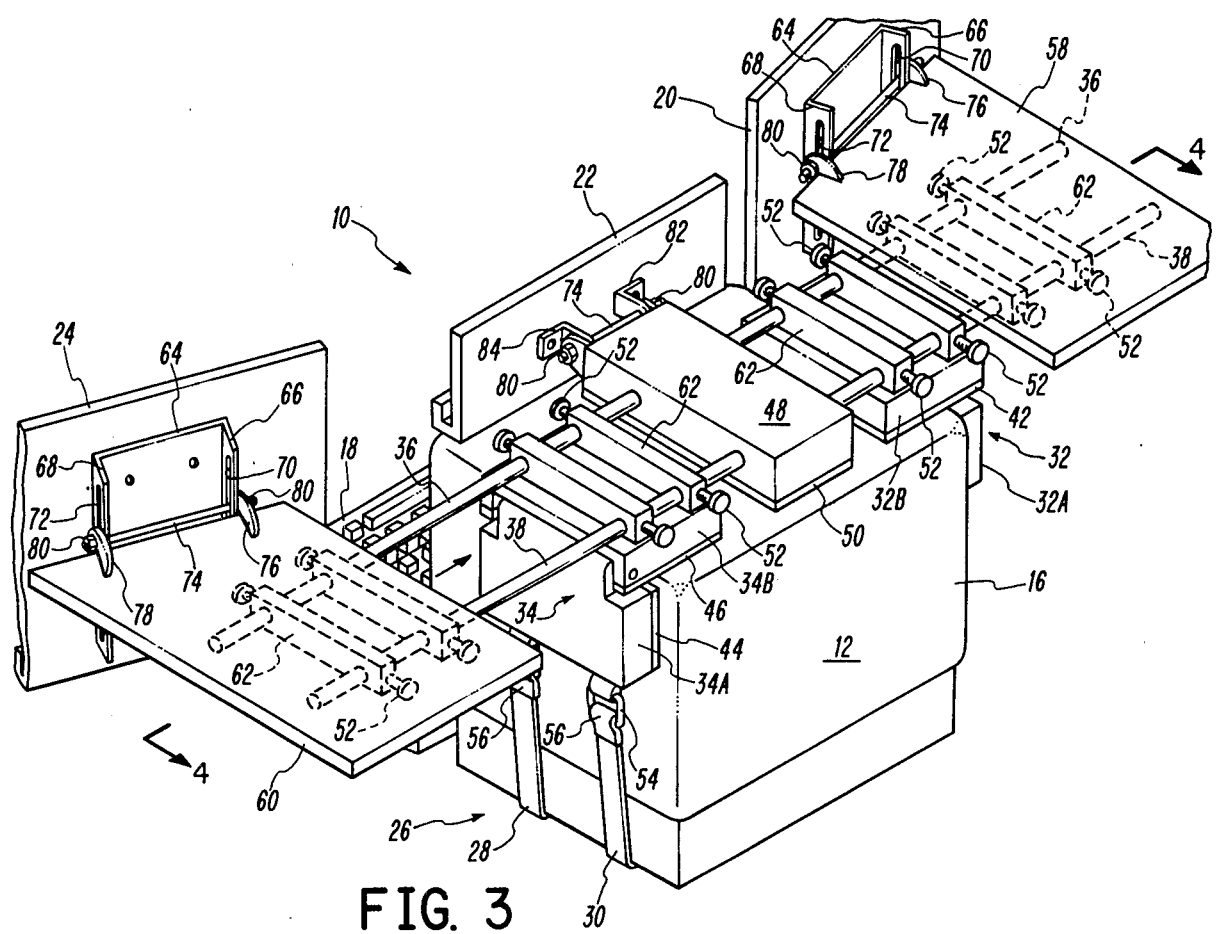
FIG. 3 is a rear perspective view which illustrates the mounting of the harness assembly of the invention onto a CRT cabinet.
Figure 4:
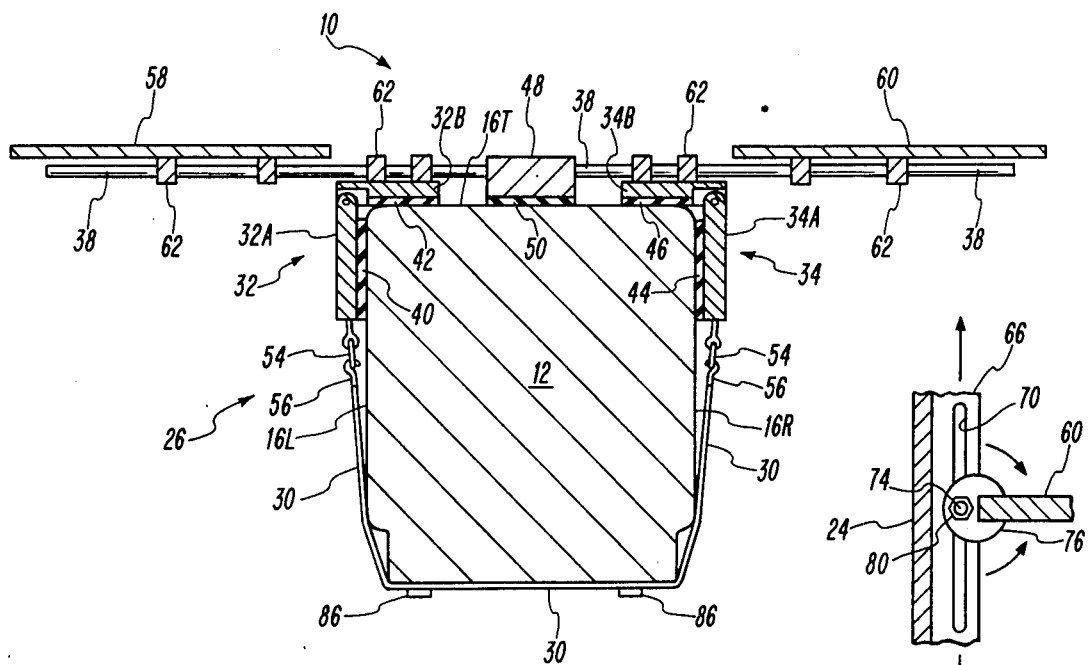
FIG. 4 is a sectional view of the CRT cabinet and harness assembly taken along the lines 4—4 of FIG. 3.
Figure 5:
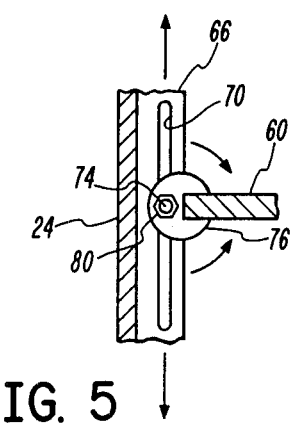
FIG. 5 is an elevation view, partly in section, and partly broken away, which illustrates coupling of the correspondence board to a wing panel support.

Referring now to FIGS. 3 and 4, the copy holder assembly 10 is mounted onto the data display cabinet 16 by a harness assembly 26. The harness assembly 26 includes first and second elastic straps 28, 30, first and second hinge assemblies 32, 34 and forward and rear cross bars 36, 38. The left and right hinge assemblies are linked together by the cross bars and by the elastic straps, thereby defining the harness assembly 26.

The harness assembly 26 is conformable to the contour of the data display cabinet 16. Conformity of the harness assembly 26 with various cabinet configurations is provided by the flexibility of the elastic straps 28, 30 and by the hinge action of the left and right hinge assemblies 32, 34. The left hinge assembly 32 includes hinge plates 32A, 32B for engaging left side panel 16L and top panel 16T, respectively, of the CRT cabinet 16. Similarly, hinge portions 34A, 34B of the right hinge assembly 34 are adapted to engage the side panel 16R and top panel 16T, respectively, of the CRT cabinet 16. The hinge plates of each hinge assembly are movably coupled together by a hinge pin 39 and engage opposite top corners of the cabinet, with the cross bars 36, 38 extending across the top of the cabinet.

Interposed between the plates of the left hinge assembly 32 and the CRT cabinet 16 are rubber pads 40, 42, and interposed between the right hinge assembly and the cabinet are rubber pads 44, 46. The purpose of the rubber pads is to produce positive frictional engagement between the hinge assemblies 32, 34 and the CRT cabinet 16. The strong, positive grip provided by the rubber pads prevents slipping and stabilizes the harness assembly against shifting movement which might otherwise occur due to unbalanced loading of the left and right correspondence boards. The rubber pads are preferably compresssible and serve as flexible shims so that the harness assembly, including the side hinge plates, will conform to non-rectangular cabinet configurations.

The top hinge plates 32B, 34B are linked together by the forward and rear cross bars 36, 38. The forward and rear cross bars 36, 38 are stabilized by a center block 48. Interposed between the center block 48 and the top panel 16T of the CRT cabinet is a rubber pad 50. The lateral separation of the left and right hinge assemblies is adjusted for a snug fit against the opposite top corners of the CRT cabinet 16. The lateral separation of the left and right hinge assemblies relative to the CRT cabinet 16 is fixed by tightening the set screws 52 which mechanically fasten the top hinge plates 32B, 34B onto the forward and rear cross bars 36, 38. The hinge plates 32B, 34B are mechanically fastened to the cross bars by coupling blocks 62 and the set screws 52. The coupling blocks 62 are provided with cylindrical bores at each end through which the cross bars 36, 38 are received, thereby permitting adjustment of the lateral separation between the left and right hinge assemblies.

The forward and rear elastic straps 28, 30 are lashed about the sides and bottom of the CRT cabinet 16. The ends of each strap are coupled to the side hinge plates 32A, 34A respectively, by a fastener which includes a buckle 54 and clasp 56. Each elastic strap 28, 30 directs a tension force through the side hinge plates 32A, 34A whereby the hinge assemblies 32, 34 are held in compressive engagement with the sides and top of the CRT cabinet 16.

Attached to the forward and rear cross bars on laterally opposite sides of the CRT cabinet 16 are a left wing panel 58 and a right wing panel 60. Each wing panel is coupled to the forward and rear cross bars 36, 38 by coupling blocks 62. The coupling blocks 62 are rigidly attached to the wing panels, and are provided with a cylindrical bore at each end through which the cross bars 36, 38 are received. By this arrangement, the lateral position of the wing panel, along with the lateral position of the correspondence board is adjustable toward and away from the CRT display screen 14. After the correct lateral position of the wing panel has been established, the wing panel is fastened onto the cross bars by tightening the set screws 52.

The left and right correspondence boards 20, 24 are coupled to the left and right wing panels 58, 60, respectively, by a bracket assembly which includes a bracket plate 64 having side flanges 66, 68. The flanges 66, 68 have aligned slots 70, 72 respectively. The correspondence board 24 is fastened directly onto the bracket plate 64, and the bracket plate 64 is pivotally coupled to the forward edge of the right wing panel 60 by a pin 74. The opposite ends of the pin 74 are threaded and project through the slots 70, 72, respectively, where they are received by coupling discs 76, 78 respectively. Each coupling disc has a rectangular slot in which the forward edge of the right wing panel is received.

The lateral position of each correspondence board 24 is set by sliding the assembly along the forward edge of the wing panel on which it rests. The elevation of the correspondence board 24 is set by raising and lowering the correspondence board 24 and bracket plate 64 relative to the pivot pin 74. The correspondence board 24 is rotatable about pivot pin 74 from an approximately vertical position as illustrated in FIG. 1 to an approximate horizontal position as illustrated in FIG. 2.

After the desired pitch orientation of the correspondence board 24 has been determined, the pitch setting and the elevation setting are fixed by compressing the coupling discs against the bracket plate flanges 66, 68. The tightening action is provided by tightening nuts 80 which are received in threaded engagement with the threaded end portions of the pivot pin 74.

The memorandum board 22 is pivotally coupled to the center block 48 by a pivot pin 74 and brackets 82, 84. The pitch orientation of the memorandum board 22 is maintained by tightening nuts 80.

The copy holder assembly 10 is preferably constructed of light weight, durable and high strength materials. For example, the forward and rear cross bars are preferably made of metal such as a high strength aluminum alloy or stainless steel. The remaining elements, including the wing panels, correspondence boards, coupling blocks and hinge plates are preferably constructed of a high strength, light weight polymer resin material. However, other materials such as wood may be used to good advantage.

Each elastic strap is preferably in the form of a narrow belt which is thin enough to wrap around the bottom of the CRT cabinet 12 without interfering with the cabinet feet 86.

To install the copy holder assembly onto the data display cabinet 16, the elastic straps are unbuckled and the set screws 52 are released. The hinge assemblies are separated and are positioned onto the left and right corners of the cabinet 16. The cross bars are then centered onto the CRT cabinet and the hinge assemblies are pushed together against the sides of the CRT cabinet. The elastic straps 28, 30 are routed underneath the cabinet 16, with the clasps 56 on opposite ends then being coupled to the buckles 54 on either side of the CRT cabinet. The elastic straps are cinched tightly as necessary to produce a strong tension force in the hinge assemblies.

After the harness assembly has been mounted and stabilized onto the CRT cabinet 16, the left and right wing panels are moved inwardly along the forward and rear cross bars until the data display screen 14 is centered with respect to the left and right correspondence boards. When this centered position has been established, the set screws 52 are tightened against the forward and rear cross bars, which securely fastens the coupling blocks 62 onto the cross bars, which locks the lateral position of the correspondence boards into place. Thereafter, the elevation and pitch of the correspondence boards is set and secured by the tightening nuts 80. The correspondence boards and memorandum board are then ready to be loaded with operator manuals, data input materials and other printed materials.

According to the foregoing arrangment, the printed sheet materials are held at an elevation and at a distance substantially the same as the operator focal length for data presented on the data display screen. This arrangement is provided by the left and right wing panels which hold the left and right correspondence boards at an angle with respect to the data display screen whereby the left and right correspondence boards lie in a tangential relation with an arc the radius of which is substantially equal to the operator focal length.

It will be appreciated that, because of the angular accommodation of the hinge assemblies and of the lateral accommodation provided by the adjustable coupling to the horizontal cross bars, and by the flexibility of the elastic straps, that the harness assembly can be fitted about cabinets of different dimensions and configurations, including trapezoidal as well as rectangular.

Because of the unique stabilizing effect of the left and right hinge assemblies which is reinforced by the rubber pads, it will be appreciated that the correspondence boards are capable of holding heavy loads associated with large, oversized operator manuals, without shifting of the harness assembly with respect to the cabinet.

The copy holder assembly can be fitted quickly and easily onto a wide variety of CRT cabinets by adjusting the lateral separation of the hinge assemblies, and by adjusting the tension in the elastic straps. The harness assembly can be quickly removed from the CRT cabinet merely by uncoupling the clasp and buckle assembly on one side of each elastic strap.

Figure 6:
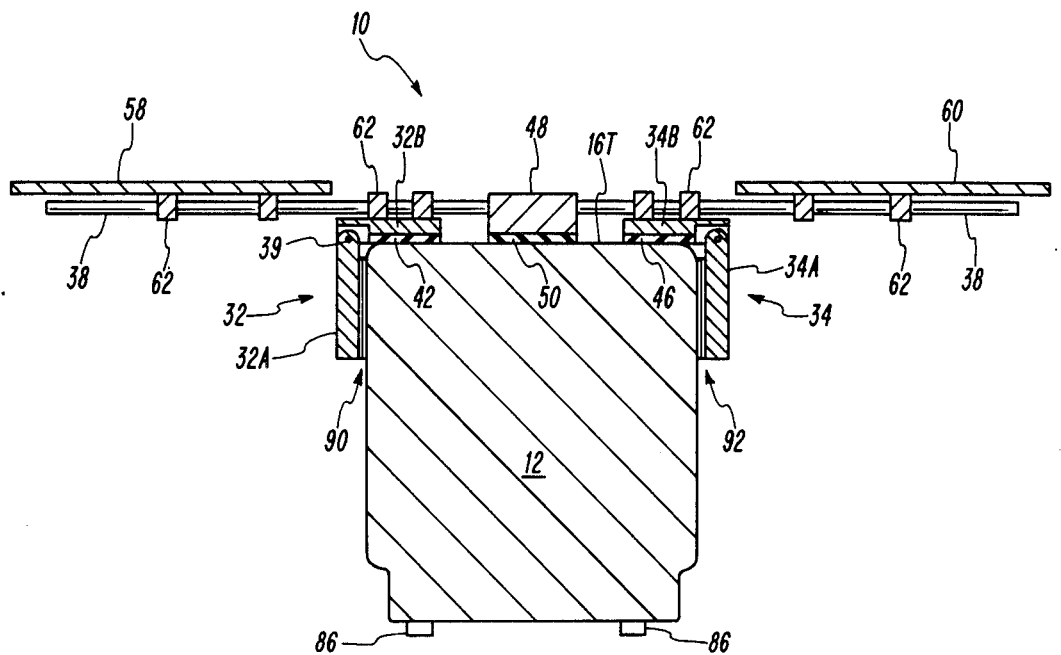
FIG. 6 is a sectional view of an alternative mounting arrangement for the copy holder assembly.
Figure 7:
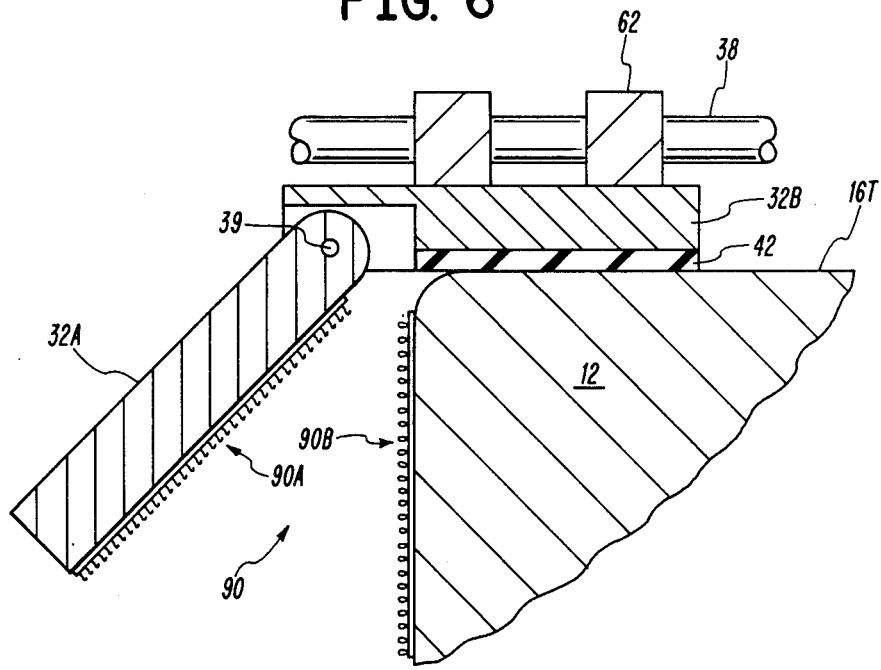
FIG. 7 is a sectional view, partly broken away, illustrating the released position of a hinge fastener.

An alternate embodiment of the invention is illustrated in FIGS. 6 and 7. According to this arrangement, the elastic straps 28, 30 are not utilized. Instead, the hinge assemblies 32, 34 are coupled to the CRT cabinet 12 by releasable hook and loop fastener pad assemblies 90, 92. The releasable hook and loop pad assembly 90 includes a hook pad 90A and a loop pad 90B. The hook fastener pad 90A is adhesively bonded to the hinge plate 32A, and the loop fastener pad 90B is adhesively bonded to the sidewall surface of the CRT cabinet 12. Rubber pads 42, 46 are interposed between the top hinge plates 32B, 34B.

The interlocking engagement of the hook and loop fastener assemblies and the strong, positive grip provided by the deformable rubber pads prevents slipping and stabilizes the harness assembly against shifting movement which might otherwise occur due to unbalanced loading of the left and right correspondence boards. The hook and loop fastener pads are preferably bonded to the hinge plates and CRT sidewall by a nontacky adhesive. The hook and loop fastener assemblies 90, 92 are identical, with the fastener assemblies extending co-extensively with the hinge plates 32A, 34A, respectively. The copy holder assembly 10 can be fitted quickly and easily onto various CRT cabinets by adjusting the lateral separation of the hinge assemblies and by securely engaging the hook and loop fastener pads of each hinge assembly.

It will be appreciated that the copy holder assembly of the invention can be constructed with a single cross bar in a configuration other than the cylindrical rod illustrated and described in the preferred embodiment. For example, a cross bar in the form of a flat plate may be used without sacrifice of stability or function. Moreover, although two elastic straps are preferred, a single elastic strap having the appropriate strength may be used to good advantage. Use of the elastic strap is avoided altogether in the hook and loop hinge fastener embodiment (FIG. 6). The cross bar may be mechanically fastened directly to the hinge plates, and the coupling blocks may be integrally formed with the hinge plates without impairing stability. Therefore, it will be appreciated that although certain preferred embodiments of the invention have been described in detail, it should be understood that various changes, substitutions and alterations can be made therein without departing from the spirit and scope of the invention as defined by the appended claims.

What is claimed is:

1. Copy holder apparatus for supporting printed sheet material for use in combination with a data processing work station of the type having a data display screen mounted in a cabinet, the copy holder apparatus comprising, in combination:

a harness assembly including a flexible tension member, a first hinge assembly, a second hinge assembly and a cross bar, the first and second hinge assemblies being linked together by the cross bar and by the flexible tension member thereby defining a harness assembly mountable onto a cabinet, wherein the first and second hinge assemblies are adapted for mounting onto opposite top corners of the cabinet, with the cross bar extending across the top of the cabinet, and the flexible tension member being adapted for lashing engagement around the cabinet bottom and tensioning the hinge assemblies into compressive engagement with the cabinet;

first and second wing panels mounted onto the cross bar;

holder means coupled to the harness assembly for displaying printed sheet material adjacent the data display screen, and, said holder means including first and second correspondence boards movably coupled to the first and second wing panels, respectively.

2. Copy holder apparatus as defined in claim 1, including bracket means interposed between the correspondence boards and the wing panels permitting movement of the correspondence boards in pitch, elevation and laterally with respect to the cabinet.

3. Copy holder apparatus as defined in claim 2, said bracket means including a bracket plate having first and second flanges, a pivot pin and first and second coupling discs, the flanges of the bracket plate each having an elongated slot in which the pivot pin is received, the pivot pin being supported by the coupling discs, and the coupling discs being slidably mounted onto the first and second wing panels, respectively.

4. Copy holder apparatus as defined in claim 1, including a center block coupled to the cross bar for engagement with the top of the cabinet, and a memo board coupled to the center block.

5. Copy holder apparatus as defined in claim 1, the first hinge assembly including a side hinge plate and a top hinge plate, said co-acting fastener means comprising a hook fastener pad attached to each side hinge plate, and a loop fastener pad adapted for attachment to the cabinet.

6. Copy holder apparatus as defined in claim 1, including a deformable pad member adapted to be mounted between each hinge assembly and the cabinet.

7. Copy holder apparatus as defined in claim 1, the first hinge assembly including a side hinge plate and a top hinge plate, the second hinge assembly including a side hinge plate and a top hinge plate, the side hinge plates of the first and second hinge assemblies being linked together by the flexible tension member, and the top hinge plates being linked together by the cross bar.

8. Copy holder apparatus for supporting printed sheet material for use in combination with a data processing work station of the type having a data display screen mounted in a cabinet, the copy holder apparatus comprising, in combination:

a harness assembly including a first hinge assembly, a second hinge assembly and a cross bar, the first and second hinge assemblies being linked together by the cross bar, wherein the first and second hinge assemblies are adapted for mounting onto opposite top corners of the cabinet, with the cross bar extending across the top of the cabinet;

co-acting fastener means carried by the first hinge assembly, by the second hinge assembly and by said cabinet for mating engagement when the first and second hinge assemblies are mounted onto the opposite top corners of the cabinet;

first and second wing panels mounted onto the cross bar;

holder means coupled to the harness assembly for displaying printed sheet material adjacent the data display screen; and, the holder means including first and second correspondence boards movably coupled to the first and second wing panels, respectively.

9. Copy holder apparatus as defined in claim 8, including bracket means interposed between the correspondence boards and the wing panels permitting movement of the correspondence boards in pitch, elevation and laterally with respect to the cabinet.

10. Copy holder apparatus as defined in claim 9, said bracket means including a bracket plate having first and second flanges, a pivot pin and first and second coupling discs, the flanges of the bracket plate each having an elongated slot in which the pivot pin is received, the pivot pin being supported by the coupling discs, and the coupling discs being slidably mounted onto the first and second wing panels, respectively.

11. Copy holder apparatus as defined in claim 8, including a center block coupled to the cross bar for engagement with the top of the cabinet, and a memo board coupled to the center block.

12. Copy holder apparatus as defined in claim 8, including a deformable pad member adapted to be mounted between each hinge assembly and the top of said cabinet.

* * * * *